(12) United States Patent
Grieshaber

(10) Patent No.: US 12,719,257 B2
(45) Date of Patent: Aug. 25, 2026

(54) DEVICE AND METHOD FOR DISCONNECTING A HIGH-VOLTAGE DIRECT ELECTRIC CURRENT WITH A FUSE, AND OSCILLATING-CURRENT OVERLOAD SYSTEM

(71) Applicant: SUPERGRID INSTITUTE, Villeurbanne (FR)

(72) Inventor: Wolfgang Grieshaber, Lyons (FR)

(73) Assignee: SUPERGRID INSTITUTE, Villeurbanne (FR)

( * ) Notice: Subject to any disclaimer, the term of this patent is extended or adjusted under 35 U.S.C. 154(b) by 152 days.

(21) Appl. No.: 18/682,633

(22) PCT Filed: Jul. 29, 2022

(86) PCT No.: PCT/FR2022/051531
§ 371 (c)(1),
(2) Date: Feb. 9, 2024

(87) PCT Pub. No.: WO2023/017221
PCT Pub. Date: Feb. 16, 2023

(65) Prior Publication Data

US 2024/0364093 A1 Oct. 31, 2024

(30) Foreign Application Priority Data

Aug. 9, 2021 (FR) ....................................... 2108592

(51) Int. Cl.
*H02H 3/02* (2006.01)
*H01H 85/46* (2006.01)
(Continued)

(52) U.S. Cl.
CPC ............ *H02H 3/021* (2013.01); *H01H 85/46* (2013.01); *H02H 3/087* (2013.01); *H02H 3/202* (2013.01);
(Continued)

(58) Field of Classification Search
CPC ............ H02H 3/02; H02H 3/087; H02H 3/20; H02H 3/22; H02H 3/021; H02H 3/202;
(Continued)

(56) References Cited

U.S. PATENT DOCUMENTS 3,737,724 A * 6/1973 Salge ..................... H02H 3/025 361/11
3,868,552 A 2/1975 Wickson
(Continued)

FOREIGN PATENT DOCUMENTS

WO 2020259924 A1 12/2020

OTHER PUBLICATIONS

French Search Report from corresponding French Patent Application No. FR2108592, Apr. 26, 2022.
(Continued)

*Primary Examiner* — Danny Nguyen
(74) *Attorney, Agent, or Firm* — Workman Nydegger

(57) ABSTRACT

A device for disconnecting a high-voltage direct electric current via a fuse interposed in a main branch, includes an overload system able to generate an oscillating overload current which, in the main branch, over at least one half-period of oscillation, is added to a fault current in terms of absolute value to ensure the melting of the fuse. A method for disconnecting a high-voltage direct electric current, via a fuse interposed in a main branch, includes: storing an electrical energy in an overload system; generating, by the overload system, an oscillating overload current which, in the main branch, over at least one half-period of oscillation, is added to the fault current in terms of absolute value to ensure the melting of the fuse.

20 Claims, 5 Drawing Sheets

(51) Int. Cl.
*H02H 3/087* (2006.01)
*H02H 3/20* (2006.01)
*H02H 3/22* (2006.01)

(52) U.S. Cl.
CPC ......... *H02H 3/22* (2013.01); *H01H 2085/466* (2013.01)

(58) Field of Classification Search
CPC ............ H02H 3/18; H02H 3/08; H01H 85/46; H01H 33/59; H01H 9/54; H01H 47/00; H01H 33/596
USPC ........................................................ 361/2–13
See application file for complete search history.

(56) References Cited

U.S. PATENT DOCUMENTS

| | | | | |
|---|---|---|---|---|
| 2013/0020881 | A1* | 1/2013 | Panousis | H01H 33/596 307/113 |
| 2016/0329179 | A1* | 11/2016 | Kim | H01H 33/596 |
| 2020/0114783 | A1 | 4/2020 | Douglass | |
| 2020/0287380 | A1* | 9/2020 | Sato | H01H 71/10 |
| 2020/0411271 | A1* | 12/2020 | Tokoyoda | H01H 85/12 |
| 2022/0068581 | A1 | 3/2022 | Wilhelm et al. | |

OTHER PUBLICATIONS

International Search Report from corresponding PCT Application No. PCT/FR2022/051531, Nov. 8, 2022.

* cited by examiner

[Fig. 1]
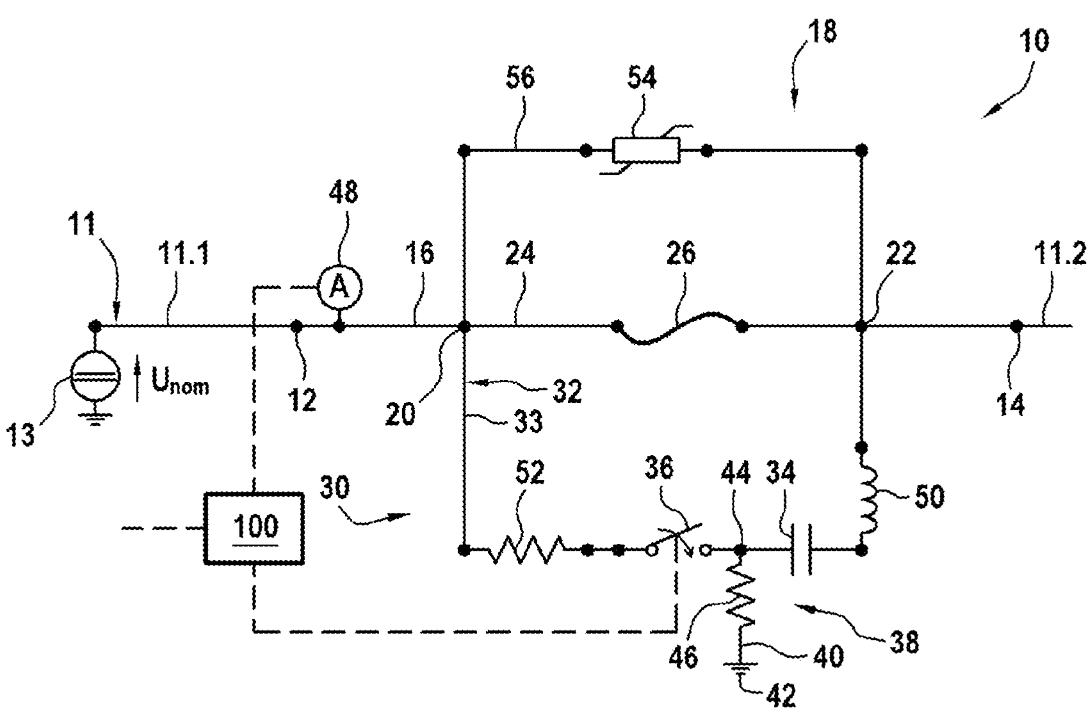
[Fig. 2]
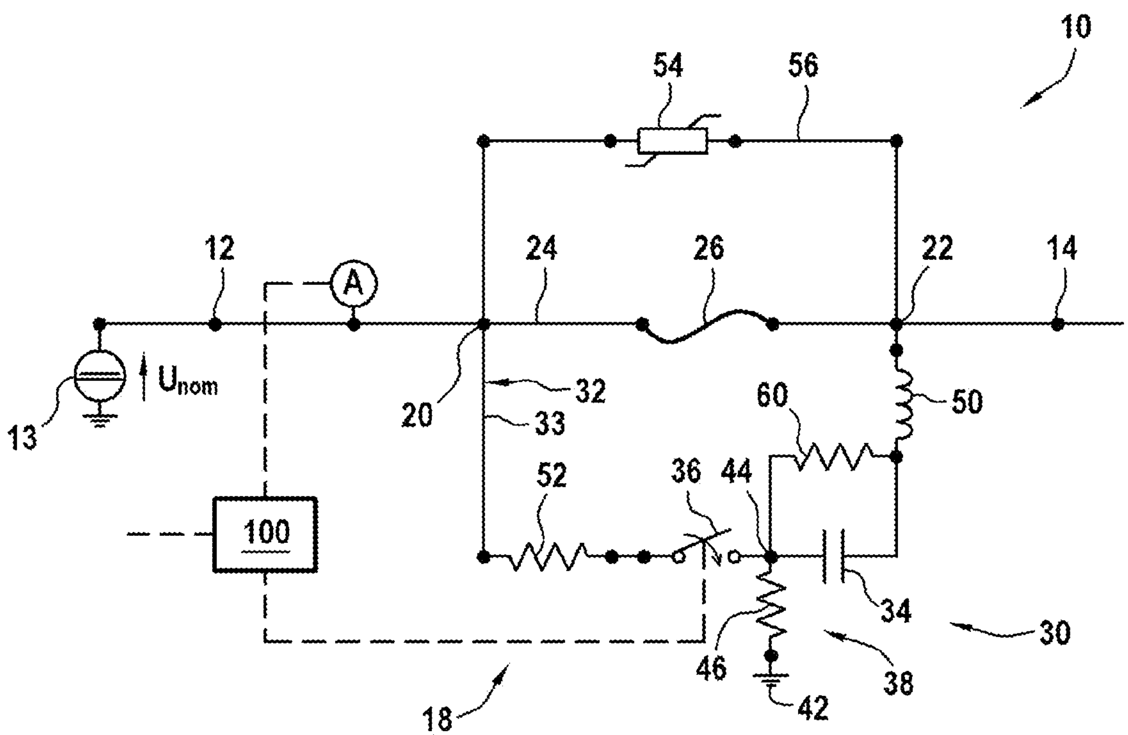

[Fig. 3]
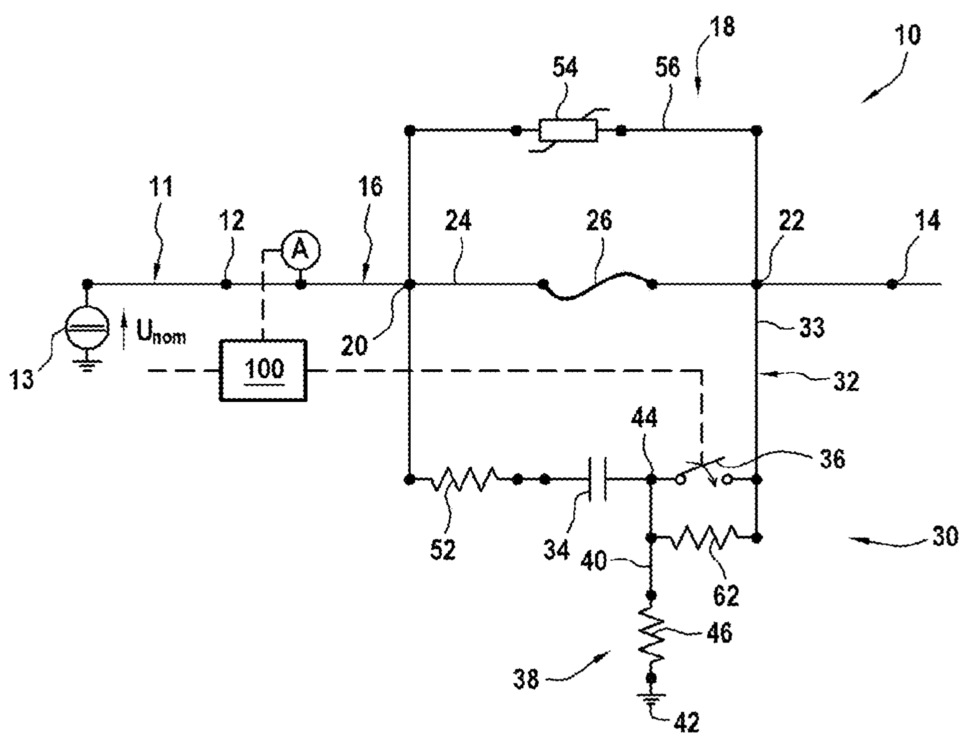
[Fig. 4]
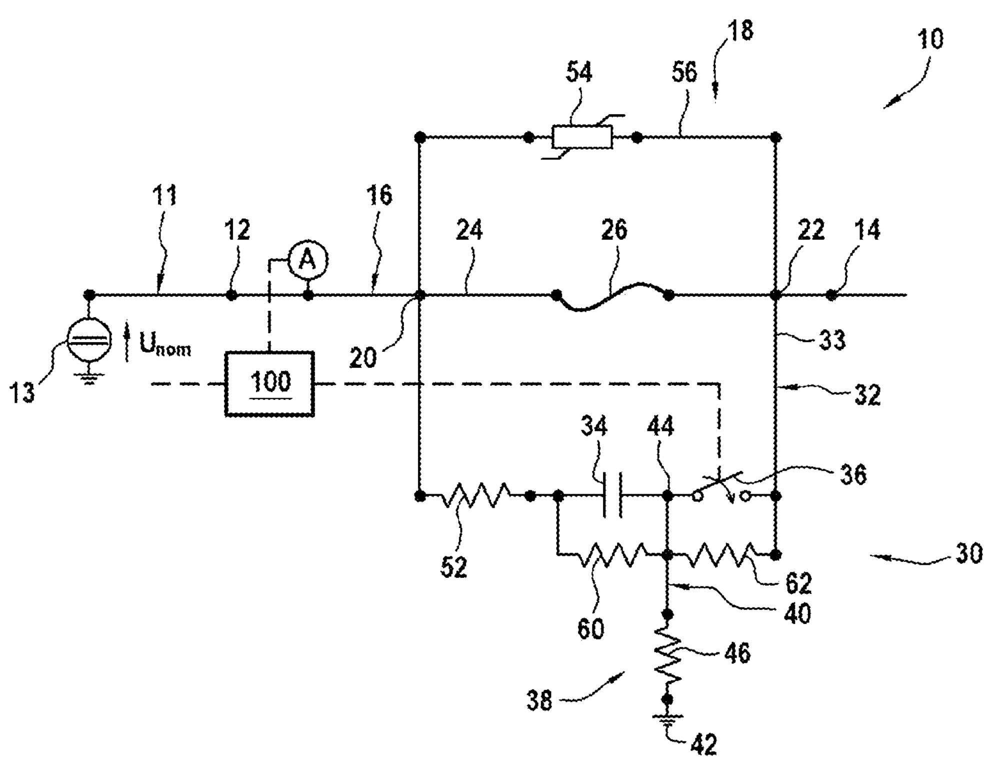

[Fig. 5]
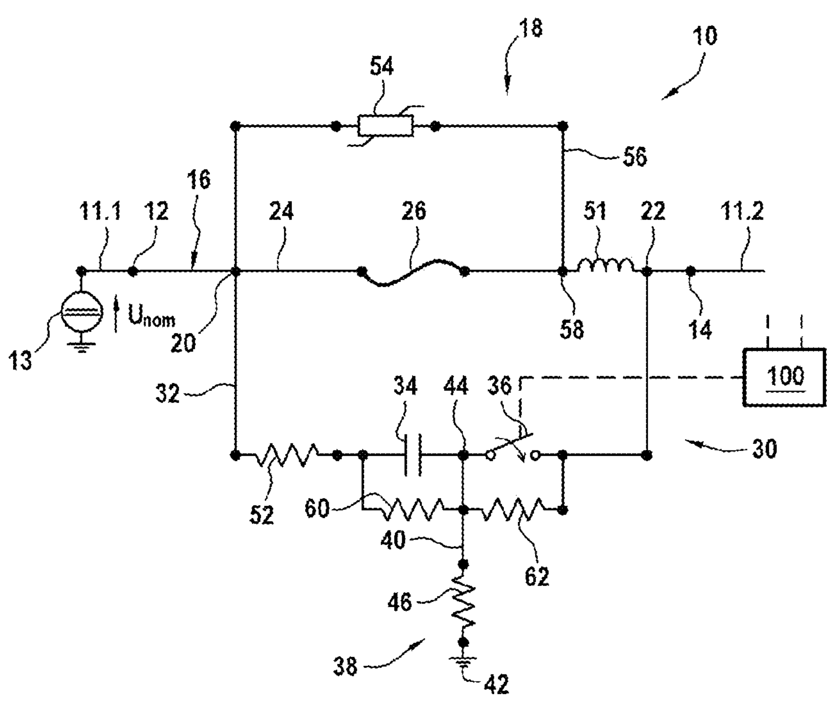
[Fig. 6]
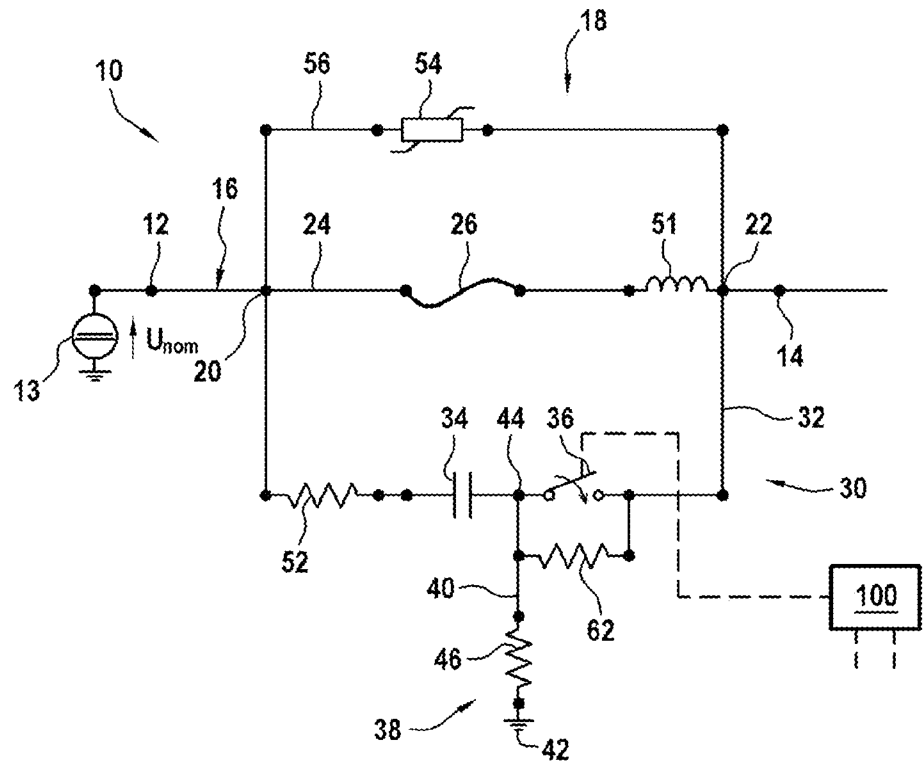

[Fig. 7]
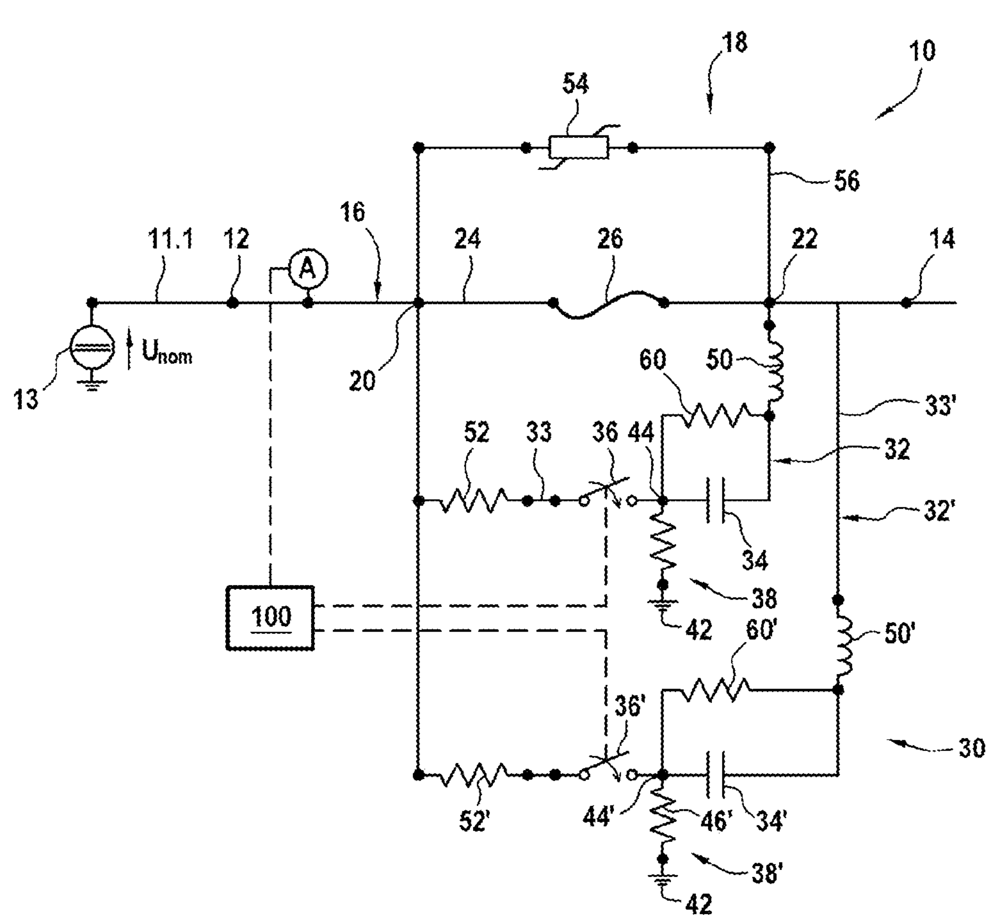

[Fig. 8]
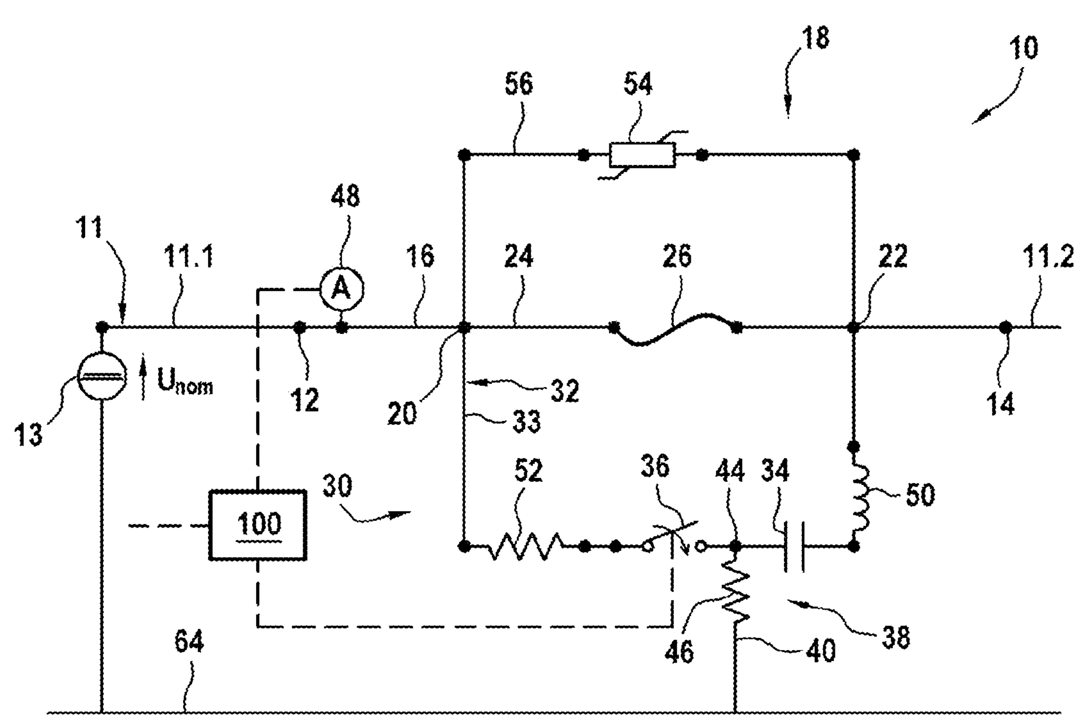

DEVICE AND METHOD FOR DISCONNECTING A HIGH-VOLTAGE DIRECT ELECTRIC CURRENT WITH A FUSE, AND OSCILLATING-CURRENT OVERLOAD SYSTEM

TECHNICAL FIELD

The invention relates to a device for disconnecting a high-voltage direct electric current (HVDC). Such devices are intended to be implemented in HVDC networks or network units in the event of appearance of an electrical fault generating a fault current in at least one electrical conductor of the network.

In this text, the following will be considered as a high-voltage direct-current device: either a "Medium High Voltage" device, wherein the nominal direct current operating voltage is greater than 1500V, but less than or equal to 75 000 V (75 kV), or a "High Voltage" device when the nominal direct current operating voltage is higher than 75 000 V (75 kV). Thus, the high-voltage direct current envelope includes the envelopes of "medium high voltage" and "high voltage".

The disconnection of current in such networks is a crucial issue directly determining the feasibility and development of such networks.

In an electrical circuit, one generally finds at least one voltage source, and at least one electrical power consumer, which may comprise any appliance or series of appliances or any network having such appliances that use electrical energy to convert it into another form of energy, for example into mechanical energy, and/or calorific, and/or electromagnetic energy etc.

In an electrical circuit, one generally finds at least one electric current disconnecting device for cutting off the flow of electric current through the circuit, generally between the voltage source and the electric power consumer.

Different types of electric current disconnecting devices are known, intended to be interposed in an electrical conductor of an electrical circuit. For example, circuit breakers are known which are designed and dimensioned to permit, in particular, breaking under load or in the fault regime of the electrical circuit in which they are interposed. Also known are electrical disconnecting devices of simpler design, such as isolation switches, which are generally not designed to ensure the disconnection of circuits under load, but rather to ensure, in a circuit where the circulation of current is already cut off by another disconnecting appliance, the safety of assets and individuals during interventions, by ensuring electrical isolation of a given high level between an upstream portion of a conductor of the circuit, connected for example to the voltage source, and a downstream portion of this conductor of the circuit.

Electric current disconnecting devices are known which are of mechanical type, the disconnection of the current being obtained by the opening of a mechanical switching element. Such a mechanical switching element includes two conductive parts making contact which are in mechanical and electrical contact when the switching element is closed and which mechanically separate when the switching element is open. This mechanical separation is generally carried out by moving a movable conductive part in relation to a fixed conductive part.

Electric current disconnecting devices are also known which are of semiconductor type, disconnection of the current being obtained by an appropriate polarization or depolarization of the device to prevent the passage of the current through the device.

Electric current disconnecting devices are also known of vacuum bulb or vacuum tube type.

All these devices have the advantage of being electric current disconnecting devices in which the disconnection of current is controlled, and is generally reversible without human intervention on the device. On the other hand, these devices still have limitations on their ability to ensure the disconnection of high currents, particularly at the highest voltages, especially in the case of direct-current voltages which, contrary to alternating-current voltages, do not have a regular crossing of a zero voltage value. Hence, the design of such devices leads to appliances which are generally, for given disconnection abilities in terms of the voltage and amperage of the current that they are capable of disconnecting, bulky and expensive.

Certain cases concern a high-voltage direct (HVDC) electric current disconnecting device in an electrical circuit in which it is known that the probability of occurrence of a fault is low, or to protect a device or a part of a network, the importance of which does not necessarily require the ability to immediately be returned to operation. In such cases, it is advisable to implement an electric current disconnecting device in which the member that ensures the disconnection of the electric current is a fuse.

BACKGROUND

The document WO2020/259924 describes a fuse which is able to be used to ensure the disconnection of high-voltage direct electric currents.

The document US2020/0411271 describes high-voltage DC electric current disconnecting devices comprising a fuse.

Of course, in an electric current disconnecting device in which the member that disconnects the electric current is a fuse, the restriction, directly related to the presence of the fuse, is known which makes the circulation of current in the electrical circuit protected by this disconnecting device unable to be reset until the fuse has been replaced. The fuse is therefore a consumable, and its replacement requires a repair operation, generally human, on the disconnecting device.

On the other hand, insofar as such a restriction is acceptable in the envisioned application, an electric current device in which the member ensuring the disconnection of electric current is a fuse has many advantages. In particular, such a device is generally, for a given disconnection ability, of smaller volume and of significantly lower cost than semiconductor or vacuum mechanical devices, which are described above. In addition, apart from possible operations to replace the fuse, such devices generally have modest operational maintenance requirements.

In such devices wherein the member that disconnects the electric current is a fuse, one is able to more reliably ensure the disconnection of the highest fault currents, since the higher the current amperage, the quicker the fuse will melt and cut off the current. Such devices will therefore be very effective for fault currents generated by low-impedance faults, for example an earth fault.

On the other hand, in a fault of higher impedance, the maximum value of the amperage of the fault current, and the speed of increase in amperage of the fault current may mean that the fault current is not sufficient to ensure fast disconnection by the device containing the fuse. Specifically, it is well-known that the disconnection performance of a fuse is generally described by a quantity that is homogeneous at a square of the amperage passing through the fuse multiplied by the time during which this current passes through the fuse (I^2×t).

In this way, it appears that while current disconnection using a fuse can prove very effective in certain situations, particularly upon the appearance of a low-impedance fault, it can prove inadequate in other cases, particularly upon the appearance of a fault of higher impedance.

In another field than that of the invention, particularly outside the field of high-voltage direct current, from the document U.S. Pat. No. 3,868,552 a current disconnecting device is known including an overload system used to inject into the fuse an overload current able to cause the melting thereof. However, this device is one-way in terms of the direction of the current injected into the fuse by the overload system. Hence if the fault current circulates in the reverse direction, the two currents tend to cancel one another out, which can make the device non-operational, or require an overdimensioning of the overload system.

The invention aims to make provision for a device and a method for disconnecting high-voltage direct current which provides effective protection, i.e. the disconnection of current in a short time, for a small cost and bulk by comparison with the known solutions in the field of high-voltage direct current.

SUMMARY

With this aim, the invention makes provision for a device for disconnecting a high-voltage direct electric current, the device including:

- a main circuit, in which circulates, in a conducting configuration of the disconnecting device, an operational electric current at a direct-current nominal operating high voltage of the device:
- at least one disconnecting module, interposed in the main circuit between a first point and a second point of the main circuit for the disconnecting module, the disconnecting module comprising a main branch, between the first point and the second point of the disconnecting module, with at least one fuse interposed in the main branch between the first point and the second point, the operational electric current circulating, in a conducting configuration of the disconnecting device, in the main branch.

The disconnecting device is of the type in which the disconnecting module comprises an overload system which, in an overload configuration of the device, in the presence of a fault current in the main circuit, is able to generate an overload current to ensure the melting of the fuse.

The device is characterized in that the overload current is an oscillating current which, in the main branch, over at least one half-period of oscillation, is added to the fault current in terms of absolute value to ensure the melting of the fuse.

Other optional features of the invention are described hereinafter, which can be implemented separately or in combination.

The overload system may include, in parallel with the main branch, an overload branch having an overload conductor which extends between the first point and the second point of the disconnecting module. The overload system then comprises:

- at least one overload capacitor which is interposed in the overload conductor of the overload branch, between the first point and the second point of the disconnecting module,
- a two-way overload making breaker which is interposed in the overload conductor of the overload branch, the overload making breaker and the overload capacitor being interposed successively one after the other in the overload conductor of the overload branch between the first point and the second point of the disconnecting module, the overload making breaker preventing, in an open state, the circulation of electric current in the overload branch between the first point and the second point of the disconnecting module, and the overload making breaker permitting, in a closed state, the two-way circulation of current in the overload branch between the first point and the second point of the disconnecting module, and
- a pre-charging circuit of the overload capacitor.

In this case, in the conducting configuration of the device, the overload making breaker is in its open state, and, in the overload configuration of the device, the overload making breaker is in its closed state to permit the discharging of the overload capacitor into the main branch, creating an oscillating overload current which, over at least one half-period of oscillation, is added in terms of absolute value to the fault current circulating in the main branch.

In certain embodiments, the disconnecting device may comprise an electronic control unit which is programmed to, in the presence of a fault current in the main circuit, command the overload making breaker to enter its closed state.

In certain embodiments, the overload making breaker has, in its open state, a maximum voltage withstand value above which it automatically switches to its closed state, and the main branch has an inductance dimensioned to create a voltage across the terminals of the main branch which is greater than the maximum voltage withstand value of the overload making breaker when a current variation speed in the main branch exceeds a given permissible value.

In certain embodiments, the main branch and the overload branch form an oscillating loop having an inductance and a capacitance dimensioned so that the discharging of the overload capacitor causes an oscillating discharging current in the loop.

In certain variants of such an embodiment, the oscillating loop includes a dedicated inductive component.

In certain of these variants, the overload branch includes a dedicated inductive component interposed in the overload conductor between the first point and the second point of the disconnecting module.

In certain embodiments, the overload arm includes a dedicated resistive component interposed in the overload conductor between the first point and the second point of the disconnecting module.

In certain embodiments, the disconnecting module comprises at least one general surge suppressor which is arranged electrically in parallel with the fuse.

In certain variants of such an embodiment, the disconnecting module comprises an absorption branch, which is arranged electrically in parallel with the main branch and with the overload branch between the first point and the second point of the disconnecting module, and the general surge suppressor is then interposed in the absorption branch between the first point and the second point.

In certain embodiments, the pre-charging circuit of the overload capacitor includes a creepage distance to a potential reference which extends between the potential reference and a tapping point in the overload branch, the tapping point being arranged in the overload conductor of the overload branch between the overload capacitor and the overload making breaker.

In certain variants of such an embodiment, the creepage distance to the potential reference includes a resistive component.

In certain embodiments, the overload making breaker is a two-way static switch, for example a two-way semiconductor switch, or a two-way switch with an electronic tube (or tubes) or a spark gap (or spark gaps).

In certain embodiments, the disconnecting module comprises, in parallel with the main branch and with the overload branch, an additional overload branch having an additional overload conductor which extends between the first point and the second point of the disconnecting module.

In such embodiments, the overload system of the disconnecting module comprises:

at least one additional overload making breaker which is interposed in the additional overload conductor of the additional overload branch, between the first point and the second point of the disconnecting module, an additional two-way overload making breaker which is interposed in the additional overload conductor of the additional overload branch, the additional overload making breaker and the additional overload capacitor being interposed successively one after the other in the additional overload conductor of the additional overload branch between the first point and the second point of the disconnecting module, the additional overload making breaker preventing, in an open state, the circulation of electric current in the additional overload branch between the first point and the second point of the disconnecting module, and the additional overload making breaker permitting, in a closed state, the two-way circulation of current in the additional overload branch between the first point and the second point of the disconnecting module, and a pre-charging circuit of the additional overload capacitor.

In such embodiment, in the conducting configuration of the device, the additional overload making breaker is in its open state, and, in an overload configuration of the device, the additional overload making breaker is in its closed state to permit the discharging of the additional overload capacitor into the main branch, creating an additional oscillating discharging current which, in the main branch, over at least one oscillation half-period, is added in terms of absolute value to the fault current circulating in the main branch.

In certain embodiments, the disconnecting module comprises at least one discharging circuit of the overload capacitor for maintenance operations.

In certain embodiments, the disconnecting module comprises, electrically in parallel with the overload capacitor, a capacitor protection resistance.

In certain embodiments, the disconnecting module comprises, electrically in parallel with the overload making breaker (36), a making breaker protection resistance (62).

In certain embodiments, the disconnecting module comprises, electrically in parallel with the overload capacitor, a capacitor resistance protector, and, electrically parallel to the overload making breaker, an making breaker protection resistance.

The invention also relates to a method for disconnecting a high-voltage direct electric current, wherein the disconnection of the electric current is ensured by the melting of a fuse which is interposed in a main branch in which circulates, in a nominal conducting phase, an operational electric current, in which the method includes:

a step of storing an electrical energy in an overload system:

a step of generating, by the overload system, an overload current which, in the main branch, is superimposed on a fault current to ensure the melting of the fuse.

In such a method, the overload current is an oscillating current which, in the main branch, over at least one half-period of oscillation, is added to the fault current in terms of absolute value.

In certain embodiments, the step of generating an oscillating overload current is triggered by the control of a two-way overload making breaker of the overload system.

In certain embodiments, the step of generating an oscillating overload current is triggered by a voltage across the terminals of an inductance of the main branch when a current variation in the main branch exceeds a given permissible value.

BRIEF DESCRIPTION OF THE DRAWINGS

FIG. 1 is a schematic view illustrating a first embodiment of the invention.

FIG. 2 is a schematic view illustrating a second embodiment of the invention.

FIG. 3 is a schematic view illustrating a third embodiment of the invention.

FIG. 4 is a schematic view illustrating a fourth embodiment of the invention.

FIG. 5 is a schematic view illustrating a fifth embodiment of the invention.

FIG. 6 is a schematic view illustrating a sixth embodiment of the invention.

FIG. 7 is a schematic view illustrating a seventh embodiment of the invention.

FIG. 8 is a schematic view illustrating an eighth embodiment of the invention.

DESCRIPTION OF THE EMBODIMENTS

In an electrical network, the transmission of electrical power between two given points of the network is done by a power transmission line which generally comprises several electrical conductors, each of which corresponds to an electrical pole of the power transmission line. In all cases, within the meaning of this text, an electrical conductor can take the form of a single electrical conductor extending between two separate points of the network under consideration, or the form of a set of electrical conductors which extend electrically in parallel between the two same separate points of the network under consideration, all the conductors of the assembly being, at any time, at the same electrical potential.

Thus, in a high-voltage direct current (HVDC) network, the transmission of electrical power between two given points of the network is done via a power transmission line which, in many cases, includes two electrical poles, each pole comprising an electrical conductor extending between the two given points of the network. In this case, the power transmission line therefore includes two electric conductors of different polarities, with, under load, for example an electrical conductor which is at a positive potential and an electrical conductor which is at a negative or neutral potential. Still in a HVDC network unit, the transmission of electrical power between two given points of the network can also be done via a power transmission channel with three electric poles comprising three electrical conductors with, under load, an electrical conductor which is at a positive potential, an electrical conductor which is at a negative potential, and an electrical conductor which is at a neutral potential. In some cases, the transmission of electrical power between two given points of the network can be done via a power transmission line with a single electrical pole, with an electrical conductor at the potential of the line and with an electrical return via the earth.

The different figures each illustrate an exemplary embodiment of a disconnecting device 10 for cutting a high-voltage direct electrical current circulating in an electrical conductor 11, which can for example belong to an electrical power transmission line in an HVDC network unit which operates at a nominal operating direct-current voltage Unom greater than 1500 V, or even greater than 75 000 V. The disconnecting device 10 is therefore interposed in the electrical conductor 11 between a primary point 12 of the device 10 and a secondary point 14 of the device 10 which may be terminals for connecting to the device 10 respectively. The disconnecting device 10 therefore partitions the electrical conductor 11 into two sections, a first section 11.1 which is connected to the primary point 12, and a second section 11.2 which is connected to the secondary point 14. In the illustrated examples, the first section 11.1 of the electrical conductor 11 is for example connected to a high-voltage direct current source 13, for example a voltage converter. In the illustrated examples, the second section 11.2 of the electrical conductor 11 is for example linked to an electrical load (not shown), for example an electrical power consumer.

The disconnecting device 10 therefore includes a main circuit 16, between the primary point 12 of the device 10 and the secondary point 14 of the device 10, in which circulates, in a conducting configuration of the disconnecting device 10, an operational electric current at a direct-current nominal operating high voltage of the disconnecting device 10 (which is the nominal operating voltage Unom of the network), which is the operational electric current circulating in the conductor 11, and the amperage of which is less than or equal to the nominal amperage for the device. Specifically, as a function of the instantaneous requirements in the network, the operational amperage, that which circulates at a given instant in the conductor 11, may vary while being less than or equal to the nominal amperage. On the other hand, in the event of an electrical fault, the amperage of the current through the disconnecting device may exceed this nominal amperage. The disconnecting device 10 is configured to play the role of a circuit breaker, namely it has the ability to cut off a current of amperage greater than or equal to the nominal amperage, so either under load at the nominal amperage, or in the presence of a fault current of amperage greater than or equal to the nominal amperage. Of course, at least for certain embodiments, the disconnecting device 10 can be configured to be also able to ensure the disconnection of a current of amperage less than the nominal amperage.

The disconnecting device 10 includes at least one disconnecting module 18 which is interposed in the main circuit 16 between a first point 20 and a second point 22 of the main circuit 16 for the disconnecting module 18. In the illustrated examples, which contain only a single disconnecting module 18, the first point 20 and the second point 22 of the main circuit 16 are points of the main circuit 16 which are at the same electrical potential as, respectively, the primary point 12 and the secondary point 14 of the disconnecting device 10 which delimit the main circuit 16 of the disconnecting device 10.

Provision could be made for the disconnecting device to be able to include several disconnecting modules that may in this case be arranged electrically in series in the main circuit 16, between the primary point 12 and the secondary point 14 of the disconnecting device 10. These several disconnecting modules 10 may be identical to, or different from one another. These several disconnecting modules 10 may for example take, one or the other, the forms of embodiment that will be described hereinafter.

The disconnecting module 18 includes a main branch 24 for the disconnecting module 18 which extends between the first point 20 and the second point 22 of the disconnecting module 18. A fuse 26 is interposed in the main branch 24, between the first point 20 and the second point 22. In a conducting configuration of the disconnecting device 10, the operational electric current circulates in the main branch 24, thus through the fuse 26. The main branch 24 of the module 18 is that in which the operational current circulates under normal network operation when the disconnecting device 10 is in its conducting configuration, the fuse 26 then being in an operational state in which it conducts the current that passes through it from one terminal to the other.

The principle of the protection of an electrical circuit by a fuse is known, including in the field of high-voltage direct current. Typically, a fuse includes a tubular outer body made of insulating materials, for example ceramic. Inside this outer tubular body, a central support is arranged co-axially and supports, on its outer cylindrical face, the fuse wire or wires which are generally made of metallic materials. The fuse wire or wires are for example made of silver, where applicable made of pure silver. The fuse wire or wires are generally wound in a spiral around the central support. The central support is made of electrically insulating materials, generally made of ceramic. Preferably, the space between the central support and the inner cylindrical face of the face of the tubular outer body is filled with a material that will promote the extinction of an electric arc which is liable to form at the moment of melting of the fuse wire or wires. This material is for example quartz sand. At the two axial ends of the outer tubular body, one generally finds contact caps which each form one of the two terminals of the fuse. Fuses able to be used in the invention are for example marketed by the company SIBA GmbH, Borker Strasse 20-22, 44354 Lünen, Allemagne.

Under the current and voltage conditions for which the fuse is constructed, the fuse is brought to a melted state in which, under the effect of the electric current traversing the fuse, the fuse wire or wires have melted, preventing any conduction of electric current through the fuse 26, therefore preventing any circulation of electric current in the main branch 24.

Of course, if there appears in the main circuit 16 a fault current, the amperage of which is very much greater than the current and voltage conditions intended for the melting of the fuse, the latter switches to its melted state spontaneously, without the need for any human or electronic control.

However, in each of the illustrated embodiments, the disconnecting module 18 moreover comprises an overload system 30 which, in an overload configuration of the device, in the presence of a fault current in the main circuit 16, is able to generate an oscillating overload current which, during at least one half-period of oscillation, is added in terms of absolute value to the fault current circulating in the main branch 24, to increase the amperage of the current through the fuse 26 and thus ensure the melting of the fuse 26.

Different overload systems 30 will be described hereinafter, with reference to the different embodiments illustrated and any variants thereof.

In all the illustrated embodiments, the overload system 30 includes at least one overload branch 32 which is arranged in parallel with the main branch 24 between the first point 20 and the second point 22 of the disconnecting module 18. This overload branch 32 includes an overload electrical conductor 33 one end of which is electrically connected directly to the first point 20 and the other end of which is electrically connected directly to the second point 22 of the disconnecting module 18, and in which are interposed at least one overload capacitor 34 and an overload making breaker 36.

In the illustrated examples, the overload capacitor 34 is illustrated in the form of a single physical component. However, the overload capacitor 34 can be embodied in the form of an assembly of several discrete capacitors arranged electrically in series and/or in parallel with one another. In this case, the overload capacitor 34 is then the capacitor which is electrically equivalent to this assembly. The overload capacitor 34 has an electrical capacitance C34.

The overload making breaker 36 is interposed in the overload conductor 33 of the overload branch 32, the overload making breaker 36 and the overload capacitor 34 being interposed successively one after the other in the overload conductor 33 of the overload branch 32 between the first point 20 and the second point 22 of the disconnecting module 18. The overload making breaker 36 and the overload capacitor 34 may be arranged in one order or the other in the overload conductor 33 of the overload branch 32, as can for example be seen by comparing on the one hand FIGS. 1 and 2, and on the other hand FIGS. 3 to 6.

The making breaker 36 can switch reversibly from an open state to a closed state. In its open state, the overload making breaker 36 prevents the circulation of electric current in the overload capacitor 33 of the overload branch 32, and, in its closed state, the overload making breaker 36 permits the two-way circulation of current in the overload conductor 33 of the overload branch 32. The overload making breaker 36 is therefore a two-way switch. Note however that, as will be understood from the operation of the device, the overload making breaker 36 does not need to be dimensioned to interrupt a load current during the transition from its closed state to its open state, and still less to cut off a fault current during the transition from its closed state to it open state. In other words, the overload making breaker 36 does not need to be dimensioned as a circuit breaker.

The overload making breaker 36 is preferably a static switch, for example a semiconductor switch or a switch with an electronic tube (or tubes) or a spark gap (or spark gaps), which makes it possible to obtain a very fast reaction time, favorable to a rapid activation of the overload system 30, and therefore to a rapid cut-off of the current by the disconnecting device 10. However, one may also envision the overload making breaker 36 including a mechanical switch or being embodied in the form of a mechanical switch.

The two-way overload making breaker 36 can for example be embodied in the form of an assembly of one-way switches, for example a parallel assembly of two thyristors mounted antiparallel. Such an assembly is analogous to a TRIAC. However, other semiconductor components could be used, such as for example IGBTs. Similarly, one may use a parallel assembly of a thyristor and a diode mounted antiparallel. However, as will be seen in particular for the example of FIG. 5 and for that of FIG. 6, one or more electronic tubes or one or more controlled or non-controlled spark gaps can also be used for the embodiment of the overload making breaker 36, for example with two electronic tubes mounted antiparallel or a spark gap, the overload making breaker 36 being in this case also a two-way static switch.

In the conducting configuration of the disconnecting device 10, the overload making breaker 36 is in its open state such that it prevents any passage of current in the overload conductor 33 of the overload branch 32 between the first point 20 and the second point 22 of the module 18.

Contrariwise, in the overload configuration of the disconnecting device 10, in the presence of a fault current in the main branch 24 that one wishes to disconnect, the overload making breaker 36 is brought into its closed state to permit the discharging of the overload capacitor 34 into the main branch 24, creating an oscillating overload current which, in the main branch 24, over one half-period of oscillation is superimposed on the fault current, increasing it in terms of absolute value. Specifically, by bringing the overload making breaker 36 into its closed state, one puts one of the foils of the overload capacitor 34 in electrical communication with the first point 20 and the other foil of the overload capacitor 34 in communication with the second point 22, which therefore allows the discharging of the overload capacitor 34 into the main branch 24. Thus, the overload system 30 makes it possible to trigger the increase in current through the fuse 26 to the point of melting it, including for fault current values which, without this increase, would not cause the melting of the fuse 26.

As indicated above, the overload system 30 has the function of creating, upon the appearance of a fault current, at least under certain conditions, an overload current. To do so, in the embodiments illustrated, the overload system 30 also includes a pre-charging circuit 38 of the overload capacitor 34. In the illustrated examples, the pre-charging circuit 38 is a circuit which draws its electrical energy from the electrical power circulating in the electrical conductor 11. For example, the pre-charging circuit 38 of the overload capacitor 34 includes a creepage distance 40 to a potential reference. In the examples of FIGS. 1 to 7, the potential reference is the earth 42, given the fact that, in these examples, the potential source 13 sets up a high-voltage direct current between the conductor 11 and the earth. However, FIG. 8 illustrates a variant of installation in which the potential source 13 sets up a high-voltage direct current between the conductor 11, which therefore forms a first pole of an electric power transmission line, having a first polarity, and another conductor which forms a second pole 64 having a second polarity different from the first polarity, for example opposed to the first polarity. Note that this variant installation has two poles, which in the example of FIG. 8 is illustrated for an identical disconnecting device to that of FIG. 1, could be adapted to all the embodiments of FIGS. 2 to 7. In both cases, the creepage distance 40 extends between the potential reference 42, 64 and a tapping point 44 in the overload branch 32, the tapping point 44 being arranged in the overload conductor 33 of the overload branch 32 between the overload capacitor 34 and the overload making breaker 36. Of course, the creepage distance 40 has an electrical resistance, which is for example embodied in the form of a resistive component 46 having an electrical resistance value R46, in order to limit the value of the creepage current liable to flow toward the potential reference 42, 64. Note that no assumption is made as to the direction of circulation of the current along the creepage distance, which depends on the respective potentials of the conductor 11 and of the potential reference 42, 64.

By the arrangement of the tapping point 44 between the overload capacitor 34 and the overload making breaker 36, an electrical circuit is created between the electrical conductor 11 and the potential reference 42, 64, an electrical circuit in which the overload capacitor 34 is interposed, and an electrical circuit which is not cut off by the overload making breaker 36 even when this is its open state. When an electrical voltage is available in the electrical conductor 11, for example when the electrical conductor 11 is brought to the operational voltage, a part of the available electrical power is therefore drawn off by the pre-charging circuit 38 to pre-charge the overload capacitor 34.

However, the pre-charging circuit 38 could take other forms, and could for example dispose of another source of electrical power, where applicable a dedicated electrical power source.

In the illustrated examples, the pre-charging circuit 38 has no switch. However, provision could be made for a switch controlled in the creepage distance 40 toward the potential reference 42, 64.

As in the illustrated examples, the disconnecting device 10 may comprise an electronic control unit 100 which is programmed to, in the presence of a fault current in the main circuit 16, command the overload making breaker 36 into its closed state. The electronic control unit 100 typically comprises at least one processor or microcontroller or FPGA and at least one electronic memory, and may comprise or be connected to one or more electronic communication circuits, for example for communication with one or more computer networks, and/or one or more electronic interface circuits, and/or one or more electronic input/output circuits. An electronic control unit may comprise or be associated with one or more display units. The electronic control unit 100 may comprise or be associated with one or more sensors, for example one or more amperage sensors and/or one or more voltage sensors, configured to measure a value of a physical parameter in the disconnecting device 10 or in the electrical installation into which the device 10 is intended to be incorporated. Some of the illustrated examples for example show an electric current amperage sensor 48, for example an ammeter, configured to measure the amperage of the current in the main circuit 16, this ammeter 48 being connected to the electronic control unit 100 so that it can possess information relative to the amperage of the electric current in the main circuit 16, and therefore also in the electric conductor 11.

The electronic control unit or units 100 is/are programmed to implement all or part of a method for controlling the device. Advantageously, provision can be made for the electronic control unit(s) 100 to communicate their command/control orders, particularly to the overload making breaker 36, by signals galvanically isolated with respect to the high-voltage direct current. These signals may be optical signals carried by optical fibers. They may be electrical signals isolated by transformers. These signals may be electromagnetic signals carried by wireless communication links.

The main branch 24 and the overload branch 32 form a loop having an inductance and a capacitance which are dimensioned so that, in the overload configuration of the disconnecting device 10, the discharging of the overload capacitor 34 causes an injection of oscillating current into the loop formed by the main branch 24 and the overload branch 32. Specifically, with a dimensioning of the loop generating an oscillating current, one can firstly maximize the peak amperage of the injected current for a given amount of energy available in the capacitor 34, and one can moreover ensure an efficiency of the overload system 30 to cause the melting of the fuse 26 whatever the direction of circulation of the fault in the main circuit 16, whatever the location of the fault with respect to the device 10 in the conductor 11 of the electrical line into which the device 10 is inserted.

In the examples illustrated in FIGS. 1, 2 and 5 to 8, the loop formed by the main branch 24 and the overload branch 32 includes a dedicated inductive component 50, 51, for example a coil or a circuit made of magnetic material (for example comprising soft iron). In the examples illustrated in FIGS. 1, 2 and 7, the dedicated inductive component 50 is interposed in the overload conductor 33 of the overload branch 32. The examples of FIGS. 5 and 6 illustrate a dedicated inductive component 51 interposed in the main branch 24. Of course, one could have dedicated inductive components both in the overload branch 32 and in the main branch 24. Conversely, the loop formed by the main branch 24 and the overload branch 32 may not contain any dedicated inductive component, but can in this case have an inductance due to the parasitic inductances of the elements included in the loop formed by the main branch 24 and the overload branch 32, which is shown for the examples of FIGS. 3 and 4.

Typically, the inductance of the loop formed by the main branch 24 and the overload branch 32 can be considered as an inductance which, in the loop, is in series in the loop with the capacitance of the overload capacitor 34.

Similarly, the loop formed by the main branch 24 and the overload branch 32 may have a resistance, either in the form of a parasitic resistance, that of the components included in the loop, or in the form of a dedicated resistive component 52 having an electrical resistance value R52 as illustrated in the figures. In this case, the resistance of the loop can be considered as a resistance in series with the inductance of the loop and with the capacitance of the overload capacitor 34.

In total, the loop thus formed by the overload branch 32 and by the main branch 24 thus form a series LC circuit or a series RLC circuit, oscillating. As a function of the voltage levels and the dimensioning of the components, it is easy to dimension the capacitance and the inductance to make the loop an oscillating loop in which the discharging of the capacitor is done in the form of a current oscillation. In doing so, one ensures that the overload current which is injected by the overload system 30 into the main branch 24 will tend to pass through the main branch 24 first in one direction during a first half-period of the oscillation of the overload current, then, immediately afterwards, in the other direction during the following half-period of oscillation of the discharging current. Thus, during at least one or the other of these two half-periods, the overload current delivered by the overload capacitor 34 will of necessity be added in terms of absolute value to the fault current traversing the disconnecting device 10 via the main branch 24. This addition in terms of absolute value is obtained whatever the initial direction of the fault current through the disconnecting device 10, and whatever the direction of pre-charging of the overload capacitor 34. With such an arrangement, the overload system 30 will be effective to cause the increase in current through the fuse 26 to the point of ensuring the melting thereof, including for fault current values which, without this increase, would not cause the melting of the fuse 26, and this applies whatever the direction of the fault current and whatever the direction of charging of the overload capacitor 34. This property is however only obtained if the overload making breaker 36 is two-way, i.e. designed so that, in its closed state, it allows the circulation of current in both directions through it.

However, even with a two-way overload system 30 as described above, it will be advantageous to configure the system such that the increase in current amperage in the fuse 26 is obtained from the first half-period of oscillation of the overload current. To do this, it will be arranged for the foil of the overload capacitor 34 which is at the potential the most different from the potential reference 42, 64 to be connected to the terminal of the fuse 26 which is connected to the part of the network which has the highest probability of remaining sound.

In the illustrated examples, the disconnecting module 18 comprises at least one general surge suppressor 54 which is arranged electrically in parallel with the fuse 26. The role of the surge suppressor is to absorb the excess energy in the electrical circuit, in particular the excess magnetic energy, when the fuse 26 has melted. In addition, the surge suppressor also makes it possible to limit the transitional cut-off voltage.

In the embodiments illustrated in FIGS. 1 to 4, and in FIG. 7, the disconnecting module 18 comprises an absorption branch 56, which is arranged electrically in parallel with the main branch 24 and with the overload branch 32 between the first point 20 and the second point 22 of the disconnecting module 18, and the general surge suppressor 54 is interposed in the absorption branch 56 between the first point 20 and the second point 22. On the other hand, in the example illustrated in FIG. 5, in which there is a dedicated inductive component 51 interposed in the main branch 24 between the first point 20 and the second point 22, it can be seen that the general surge suppressor 54 is arranged electrically in parallel with the fuse 26, but the absorption branch 56 extends between the first point 20 and a junction point 58 which is located in the main branch 24 between the fuse 26 and the dedicated inductive component 51. Contrariwise, in the example illustrated in FIG. 6, in which there is also a dedicated inductive component 51 interposed in the main branch 24 between the first point 20 and the second point 22, the general surge suppressor 54 is arranged electrically in parallel with the fuse 26 and with the dedicated inductive component 51 since, in this disposition, the absorption branch 56 extends between the first point 20 and the second point 22.

Provision could also be made for a surge suppressor to be arranged directly in parallel with the overload capacitor 34.

The examples of FIGS. 2, 3 and 4 illustrate means for being able to adapt the maximum voltage the overload making breaker 36 and/or the overload capacitor 34 must resist.

For example, FIG. 2 illustrates the possibility of putting, electrically in parallel with the overload capacitor 34, directly in parallel with the terminals thereof, a capacitor protection resistance 60 having an electrical resistance value R60. In this way, under continuous operation when the overload making breaker 36 is in its open state, the voltage U34 across the terminals of the overload capacitor 34 is at the most equal to:

$$U34 = Unom \times R60/(R60 + R46)$$

Thus, by a shrewd choice of the resistance values R60 and R46, it can be arranged for the maximum voltage the overload capacitor 34 and the overload making breaker 36 must withstand to be less than, or even noticeably less than the nominal operating voltage Unom of the network. In this way the most favorable trade-off can be struck, particularly from the point of view of bulk and cost of the components, between the capacitance value of the overload capacitor 34 and the maximum voltage the overload capacitor 34 and the overload making breaker 36 must resist.

Note that the capacitor protection 60, thus arranged, directly in parallel with the terminals of the overload capacitor 34, forms a discharging circuit of the overload capacitor 34 for maintenance operations, and this independently of the state of the fuse 26, i.e. whether or not it is melted. Specifically, when the device 10 is no longer energized, for example when the conductor 11 has been isolated from the network, the electrical energy contained in the overload capacitor 34 gradually discharges into the capacitor protection resistance 60. Note that care must be taken to ensure that the time constant governing this discharging into the capacitor protection resistance 60 is much greater than the time constant of discharging of the overload capacitor 34 into the main branch 24 when the overload making breaker 36 is brought into its closed state.

FIG. 3 illustrates the possibility of putting, electrically in parallel with the overload making breaker 36, directly in parallel with the terminals thereof, a making breaker protection resistance 62 having an electrical resistance value R62. In this way, in direct current operation when the overload making breaker 36 is in its open state, the voltage U36 across the terminals of the overload making breaker 36 is at the most equal to:

$$U36 = Unom \times R62/(R62 + R46)$$

Thus, by a shrewd choice of the resistance values R62 and R46, one can arrange for the maximum voltage the overload making breaker 36 must resist to be less than, or even noticeably less than the nominal operating voltage Unom of the network, which makes it possible to reduce the cost and bulk thereof. As long as the fuse has not melted, this resistance also allows the slow discharging of the overload capacitor 34 to make it possible to carry out maintenance on it.

FIG. 4 illustrates the combination of the two preceding possibilities, with, electrically in parallel with the overload capacitor 34, directly in parallel with the terminals thereof, a capacitor protection resistance 60 having an electrical resistance value R60, and, electrically in parallel with the overload making breaker 36, directly in parallel with the terminals thereof, a making breaker protection resistance 62 having an electrical resistance value R60.

The examples of FIG. 5 and of FIG. 6 illustrate two operating modes wherein the engaging of the overload system 30, by closing of the overload making breaker 36, may be obtained, at least for certain fault current conditions, automatically, without necessarily relying on electronic control of the overload making breaker 36.

In these two examples, the overload making breaker 36 has, in its open state, a maximum voltage withstand value above which it automatically switches into its closed state, without destruction of the overload making breaker 36, thus reversibly. In other words, when a voltage is applied across the terminals of the overload making breaker 36 which exceeds the maximum voltage withstand value, it automatically switches into its closed state, without any external control, particularly without any external electronic command. The embodiments of FIGS. 5 and 6 illustrate a protection resistance 62 in parallel with the making breaker 36. This has the effect of reducing the voltage across the terminals of the making breaker 36, and thus of increasing the self-closing point. This can in particular be made use of for high nominal operating voltage Unom values.

Typically, the overload making breaker 36 can, for such embodiments in particular, be embodied in the form of one or more electronic tubes or spark gaps for which this ability to automatically switch to the closed state can be done without damaging the switch. In these two examples, the main branch 24 has an inductance dimensioned to create a voltage across the terminals of the main branch 24 which is added to the voltage across the terminals of the overload capacitor 34 in such a way that the sum of the two voltages is greater than the maximum voltage withstand value of the overload making breaker 36 when a current variation speed (dI24/dt) in the main branch 24 exceeds a given permissible value. In the two illustrated examples, this inductance is illustrated in the form of a dedicated inductive component 51 which is interposed in the main branch 24 between the first point 18 and the second point 22. However, there again, this inductance could result entirely or partly from parasitic inductances in this main branch 24. Hence, it will be understood that in the presence of a fault current having a very great variation speed, greater than the permissible variation speed, a voltage appears across the terminals of the inductance of the main branch 24, thus across the terminals of the main branch 24, a voltage which is added to the voltage of the overload capacitor 34 and is applicable across the terminals of the overload making breaker 36 and which causes its transition to the closed state, which engages the discharging of the overload capacitor 34 as described above. With such an embodiment, it is possible to dispense with an electronic control unit for the overload making breaker 36. However, as illustrated in FIGS. 5 and 6, such embodiments can also be used with controlled spark gaps or controlled electronic tubes (which transition from their naturally closed state above a threshold voltage) and implement an electronic control unit as described above, for example to cause an engagement of the overload system 30 for currents having an insufficient variation speed to cause the automatic engagement.

It will be advantageous to configure the system such that the increase in current amperage in the fuse 26 is obtained from the start of the voltage increase across the terminals of the inductance 51. To do this, one will arrange for the foil of the overload capacitor 34 which is at the potential the most different from the potential reference 42, 64 to be connected to the terminal of the fuse 26 which is connected to the network part which has the highest probability of faults appearing.

FIG. 7 illustrates the possibility of having a disconnecting module 18 comprising, in addition to an overload branch 32 as described above, in parallel with the main branch 24 and with the overload branch 32, an additional overload branch 32' having an additional overload conductor 33' extending between the first point 20 and the second point 22 of the disconnecting module 18.

In the illustrated example, the additional overload branch 32' is of identical structure to the overload branch 32, and the choice has been made to show the case where the overload branch 32 is identical to that described with reference to the embodiment of FIG. 2. Besides the identical structure between the additional overload branch 32' and the overload branch 32, both branches can have the same dimensioning of their components, particularly as regards the electrical capacitance C34, C34' of their respective overload capacitors.

In all cases, a disconnecting module 18 having such an additional overload branch 32' comprises:

at least one additional overload capacitor 34' which is interposed in the additional overload conductor 33' of the additional overload branch 32', between the first point 20 and the second point 22 of the disconnecting module 18, an additional two-way overload making breaker 36', which is interposed in the additional overload conductor 33' of the additional overload branch 32', the additional overload making breaker 36' and the additional overload capacitor 34' being interposed successively one after the other in the additional overload conductor 33' of the additional overload branch 32' between the first point 20 and the second point 22 of the disconnecting module 18, the additional making breaker 36' preventing, in an open state, the circulation of electric current in the additional overload branch 32' between the first point 20 and the second point (22) of the disconnecting module, and the additional making breaker 36' permitting, in a closed state, the two-way circulation of current in the additional overload branch 32' between the first point 20 and the second point 22 of the disconnecting module.

Similarly, provision is made for a pre-charging circuit 38' of the additional overload capacitor 34'. In the example this pre-charging circuit 38' has an identical structure to that described above.

In the conducting configuration of the device 10, the additional overload making breaker 36' is in its open state. In an overload configuration of the device 10, the additional overload making breaker 32' is in its closed state to permit the discharging of the additional overload capacitor 34' into the main branch 24, creating an oscillating additional overload current which, in the main branch 24, over at least one half-period of oscillation, is added in terms of absolute value to the fault current circulating in the main branch 24.

Typically, the additional overload making breaker 36' will itself also be controlled by the electronic control unit 100, and preferably, the additional overload making breaker 36' and the overload making breaker 36 are controlled to transition to their closed state at the same time.

Such a disconnecting module may be advantageous to implement overload making breakers 36, 36' which have a limited conducting power in terms of "transferred loads", i.e. as an accumulated load that has passed through the making breaker. Care should however be taken that the making breakers 36, 36' are brought into their closed state simultaneously, for the discharging current amplitudes are added together in the main branch 24, which is preferably implemented using controlled making breakers triggered at the same time.

The example of FIG. 7 again shows the possibility of making provision for a general surge suppressor 54, with, in this example, the absorption branch 56, in which the general surge suppressor 54 is interposed, which is arranged electrically in parallel with the additional overload branch 32' between the first point 20 and the second point 22 of the disconnecting module 18.

There will now follow a description of an example of a method for dimensioning a disconnecting device 10 according to the invention.

The aim is for the loop formed by the main branch 24 and the overload branch 32 to form an oscillating loop. The case here is that of a weakly damped circuit, i.e. for example a circuit that satisfies the following condition:

$$R52 < 2\sqrt{(L50 + L51)/C34} \quad \text{[Math. 1]}$$

Where:

L50 is the value of the inductance which is only in the overload branch 32;

L51 is the inductance through which current passes under normal operation, therefore in the main branch 24

R52 is the total resistance of the loop formed by the overload branch 32 and by the main branch 24.

Note that, for greater values of the total resistance of the looped formed by the overload branch 32 and by the main branch 24, the device can operate, but then requires an increase in the value of the capacitance of the overload capacitor 34, and therefore of its cost and volume.

One can then determine the half-period T/2 of oscillation of the overload current incurred by the discharging of the overload capacitor 34 according to the relationship:

$$\frac{T}{2} = \pi\sqrt{C34 * (L50 + L51)} \quad \text{[Math. 2]}$$

Similarly, one can then determine a peak current Ipk of the discharging current of the overload capacitor 34 obtained assuming that R52 is zero or negligible, which is given by the relationship:

$$Ipk = U34\sqrt{\frac{C34}{L50 + L51}} \quad \text{[Math. 3]}$$

Where:

U34 is the load voltage across the terminals of the overload capacitor 34.

One then seeks to determine the characteristic parameter "$I^2t$" of one half-period of oscillation of the discharging current of the overload capacitor 34 while neglecting the contribution of the current I24 circulating in the branch.

The value of this characteristic parameter is determined by integration of the peak amplitude Ipk of a harmonic current, over one half-period:

$$I^2t = \int_0^{T/2} Ipk^2 dt \quad \text{[Math. 4]}$$

As a function of the relationships above, the characteristic parameter "$I^2t$" of one half-period of oscillation of the discharging current of the overload capacitor 34 is expressed in the following successive forms:

$$I^2t = \int_0^{\pi\sqrt{C34*(L50+L51)}} \left[U34\sqrt{\frac{C34}{L50 + L51}}\sin\left(\frac{t}{\sqrt{C34 * (L50 + L51)}}\right)\right]^2 dt \quad \text{[Math. 5]}$$

For the dimensioning of the loop, one can then arrange for the characteristic parameter "$I^2t$" of one half-period of oscillation of the discharging current of the overload capacitor 34, as defined by the relationship above, to be greater than or equal to the parameter "$I^2t$" of the fuse 26, which is a given characteristic supplied by the manufacturer of the fuse 26.

When the value R52 of the resistance 52 significantly increases, there is damping in the loop and the value of the characteristic parameter "$I^2t$" of one half-period of oscillation of the discharging current of the overload capacitor 34 decreases. In this case it is therefore necessary to increase the value of the capacitance of the overload capacitor 34, or, with a voltage divider, increase the voltage U34 across the terminals of the overload capacitor 34.

The disconnecting devices above are examples of devices that make it possible to implement a method for disconnecting a high-voltage direct electric current, in which the disconnection of the electric current is ensured by the melting of a fuse 26 which is interposed in a main branch 24 in which circulates, in a nominal conducting phase, an operational electric current, and wherein the method includes:

a step of storing an electrical energy in an overload system 30;

a step of generating, by the overload system 30, an oscillating overload current which, in the main branch 24, over at least one half-period of oscillation, is added to the fault current in terms of absolute value to ensure the melting of the fuse 26.

In certain embodiments, or at least under certain current and voltage conditions, the step of generating an oscillating overload current is triggered by the control, for example by means of an electronic control unit 100, of a two-way overload making breaker 36, 36' of the overload system 30.

In certain embodiments, such as those of FIGS. 5 and 6, and at least under certain current and voltage conditions, the step of generating an oscillating overload current is triggered by a voltage across the terminals of an inductance 51 of the main branch 24 when a current variation in the main branch 24 exceeds a given permissible value.

The invention claimed is:

1. A device for disconnecting a high-voltage direct electric current, the device including:

a main circuit, in which circulates, in a conducting configuration of the disconnecting device, an operational electric current at a direct-current nominal operating high voltage (Unom) of the device;

at least one disconnecting module, interposed in the main circuit between a first point and a second point of the main circuit for the disconnecting module, the disconnecting module comprising a main branch, between the first point and the second point of the disconnecting module, with at least one fuse interposed in the main branch between the first point and the second point, the operational electric current circulating, in a conducting configuration of the disconnecting device, in the main branch, and the disconnecting device being of the type in which the disconnecting module comprises an overload system which, in an overload configuration of the device, in the presence of a fault current in the main circuit, is able to generate an overload current to ensure the melting of the fuse, wherein the overload current is an oscillating current which, in the main branch, over at least one half-period of oscillation, is added to the fault current in terms of absolute value to ensure the melting of the fuse.

2. The device as claimed in claim 1, wherein the overload system includes, in parallel with the main branch, an overload branch having an overload conductor which extends between the first point and the second point of the disconnecting module, in that the overload system comprises:

at least one overload capacitor which is interposed in the overload conductor of the overload branch, between the first point and the second point of the disconnecting module, a two-way overload making breaker which is interposed in the overload conductor of the overload branch, the overload making breaker and the overload capacitor being interposed successively one after the other in the overload conductor of the overload branch between the first point and the second point of the disconnecting module, the overload making breaker preventing, in an open state, the circulation of electric current in the overload branch between the first point and the second point of the disconnecting module, and the overload making breaker permitting, in a closed state, the two-way circulation of current in the overload branch between the first point and the second point of the disconnecting module, and a pre-charging circuit of the overload capacitor;

wherein in the conducting configuration of the device, the overload making breaker is in its open state; and wherein in the overload configuration of the device, the overload making breaker is in its closed state to permit the discharging of the overload capacitor into the main branch, creating an oscillating overload current which, over at least one half-period of oscillation, is added in terms of absolute value to the fault current circulating in the main branch.

3. The device as claimed in claim 2, wherein the disconnecting device comprises an electronic control unit which is programmed to, in the presence of a fault current in the main circuit, command the overload making breaker to enter its closed state.

4. The device as claimed in claim 2, wherein the overload making breaker has, in its open state, a maximum voltage withstand value above which it automatically switches to its closed state, and in that the main branch has an inductance dimensioned to create a voltage across the terminals of the main branch which is greater than the maximum voltage withstand value of the overload making breaker when a current variation speed in the main branch exceeds a given permissible value.

5. The device as claimed in claim 2, wherein the main branch and the overload branch form an oscillating loop having an inductance and a capacitance dimensioned so that the discharging of the overload capacitor causes an oscillating discharging current in the loop.

6. The device as claimed in claim 5, wherein the oscillating loop includes a dedicated inductive component.

7. The device as claimed in claim 5, wherein the overload branch includes a dedicated inductive component interposed in the overload conductor between the first point and the second point of the disconnecting module.

8. The device as claimed in claim 2, wherein the overload branch includes a dedicated resistive component interposed in the overload conductor between the first point and the second point of the disconnecting module.

9. The device as claimed in claim 2, wherein the disconnecting module comprises at least one general surge suppressor which is arranged electrically in parallel with the fuse.

10. The device as claimed in claim 9, wherein the disconnecting module comprises an absorption branch, which is arranged electrically in parallel with the main branch and with the overload branch between the first point and the second point of the disconnecting module, and in that the general surge suppressor is interposed in the absorption branch between the first point and the second point.

11. The device as claimed in claim 2, wherein the precharging circuit of the overload capacitor includes a creepage distance to a potential reference which extends between the potential reference and a tapping point in the overload branch, the tapping point being arranged in the overload conductor of the overload branch between the overload capacitor and the overload making breaker;

wherein the creepage distance to the potential reference includes a resistive component.

12. The device as claimed in claim 2, wherein the overload making breaker is a two-way static switch;

wherein the overload making breaker is a two-way semiconductor switch; and wherein the overload making breaker is a two-way switch with an electronic tube (or tubes) or a spark gap (or spark gaps).

13. The device as claimed in claim 2, wherein the disconnecting module comprises, in parallel with the main branch and with the overload branch, an additional overload branch having an additional overload conductor which extends between the first point and the second point of the disconnecting module, in that the overload system of the disconnecting module comprises:

at least one additional overload capacitor which is interposed in the additional overload conductor of the additional overload branch, between the first point and the second point of the disconnecting module, an additional two-way overload making breaker which is interposed in the additional overload conductor of the additional overload branch, the additional overload making breaker and the additional overload capacitor being interposed successively one after the other in the additional overload conductor of the additional overload branch between the first point and the second point of the disconnecting module, the additional overload making breaker preventing, in an open state, the circulation of electric current in the additional overload branch between the first point and the second point of the disconnecting module, and the additional overload making breaker permitting, in a closed state, the two-way circulation of current in the additional overload branch between the first point and the second point of the disconnecting module, and a pre-charging circuit of the additional overload capacitor;

in that, in the conducting configuration of the device, the additional overload making breaker is in its open state;

and in that, in an overload configuration of the device, the additional overload making breaker is in its closed state to permit the discharging of the additional overload capacitor into the main branch, creating an oscillating additional discharging current which, in the main branch, over at least one oscillation half-period, is added in terms of absolute value to the fault current circulating in the main branch.

14. The device as claimed in claim 2, wherein the disconnecting module comprises at least one discharging circuit of the overload capacitor for maintenance operations.

15. The device as claimed in claim 12, wherein the disconnecting module comprises, electrically in parallel with the overload capacitor, a capacitor protection resistance.

16. The device as claimed in claim 12, wherein that the disconnecting module comprises, electrically in parallel with the overload making breaker, and making breaker protection resistance.

17. The device as claimed in claim 12, wherein the disconnecting module comprises, electrically in parallel with the overload capacitor, a capacitor protection resistance, and, electrically in parallel with the overload making breaker, and making breaker protection resistance.

18. A method for disconnecting a high-voltage direct electric current, wherein the disconnection of the electric current is ensured by the melting of a fuse which is interposed in a main branch in which circulates, in a nominal conducting phase, an operational electric current, in which the method includes:

a step of storing an electrical energy in an overload system;

a step of generating, by the overload system, an overload current which, in the main branch, is superimposed on a fault current to ensure the melting of the fuse, wherein the overload current is an oscillating current which, in the main branch, over at least one half-period of oscillation, is added to the fault current in terms of absolute value.

19. The method as claimed in claim 18, wherein the step of generating an oscillating overload current is triggered by the control of a two-way overload making breaker of the overload system.

20. The method as claimed in claim 19, wherein the step of generating an oscillating overload current is triggered by a voltage across the terminals of an inductance of the main branch when a current variation in the main branch exceeds a given permissible value.

* * * * *